US008510248B2

(12) United States Patent
Koren et al.

(10) Patent No.: US 8,510,248 B2
(45) Date of Patent: Aug. 13, 2013

(54) BOOTSTRAPPING RECOMMENDER SYSTEM AND METHOD

(75) Inventors: Yehuda Koren, Zichron Yaakov (IL); Ronny Lempel, Zichron Yaakov (IL); Nadav Golbandi, Haifa (IL)

(73) Assignee: Yahoo! Inc., Sunnyvale, CA (US)

( * ) Notice: Subject to any disclaimer, the term of this patent is extended or adjusted under 35 U.S.C. 154(b) by 301 days.

(21) Appl. No.: 12/949,429

(22) Filed: Nov. 18, 2010

(65) Prior Publication Data

US 2012/0130931 A1 May 24, 2012

(51) Int. Cl.
*G06F 17/00* (2006.01)
*G06N 5/02* (2006.01)

(52) U.S. Cl.
USPC .......................................................... 706/46

(58) Field of Classification Search
USPC .......................................................... 706/46
See application file for complete search history.

(56) References Cited

U.S. PATENT DOCUMENTS

| | | | |
|---|---|---|---|
| 7,034,691 B1 * | 4/2006 | Rapaport et al. ............ 340/573.1 |
| 7,099,836 B2 * | 8/2006 | Cichanowicz ................ 705/26.8 |
| 7,212,976 B2 * | 5/2007 | Scheer ............................ 705/7.34 |
| 7,313,534 B2 * | 12/2007 | Scheer ............................ 705/7.26 |
| 7,324,966 B2 * | 1/2008 | Scheer ................................ 705/28 |
| 7,436,311 B2 * | 10/2008 | Rapaport et al. ............ 340/573.1 |
| 7,529,691 B2 * | 5/2009 | Cichanowicz ................ 705/26.8 |
| 7,873,620 B2 * | 1/2011 | Ozzie et al. ..................... 707/706 |
| 7,916,014 B2 * | 3/2011 | Rapaport et al. ........... 340/539.12 |
| 8,032,532 B2 * | 10/2011 | Broder et al. .................. 707/742 |
| 8,037,080 B2 * | 10/2011 | Koren .............................. 707/754 |
| 8,131,726 B2 * | 3/2012 | Broder et al. .................. 707/741 |
| 8,193,931 B2 * | 6/2012 | Rapaport et al. .......... 340/539.12 |
| 8,219,544 B2 * | 7/2012 | Bluger et al. ................... 707/711 |
| 8,229,798 B2 * | 7/2012 | Koren et al. ................... 705/26.7 |
| 8,271,498 B2 * | 9/2012 | Fontoura et al. ............... 707/742 |
| 8,285,483 B2 * | 10/2012 | Amer-Yahia et al. .......... 701/428 |
| 8,301,482 B2 * | 10/2012 | Reynolds et al. ............. 705/7.29 |
| 8,346,759 B2 * | 1/2013 | Fontoura et al. ............... 707/715 |
| 8,380,682 B2 * | 2/2013 | Broder et al. .................. 707/693 |

OTHER PUBLICATIONS

J. Bennett and S. Lanning. The Netflix Prize. Proc KDD Cup and Workshop, 2007; 4 pages.
L. Breiman. Random Forests. Machine Learning 45:1, pp. 5-32, 2001.
J. H. Friedman. Stochastic Gradient Boosting. Computational Statistics & Data Analysis 38:4, pp. 367-378, 2002.
D. Goldberg, D. Nichols, B. M. Oki and D. Terry. Using Collaborative Filtering to Weave an Information Tapestry. Communications of the ACM 35:12, pp. 61-70, 1992.
J. Herlocker, J. Konstan, L. Terveen and J. Riedl. Evaluating Collaborative Filtering Recommender Systems. ACM Transactions on Information Systems 22:1, pp. 5-53, 2004.

(Continued)

*Primary Examiner* — Michael B Holmes
(74) *Attorney, Agent, or Firm* — James J. DeCarlo; Greenberg Traurig, LLP

(57) ABSTRACT

Bootstrapping a recommender system that makes item recommendations. The bootstrapping identifying questions for use in interviewing a user, e.g., a new user to the recommender system, to obtain user information, e.g., user profile information, for use in predicting item ratings for the user, the predicted item ratings for use in identifying item recommendations for the user. The bootstrapping using a cost function to minimize error in selection of the questions for the interview. The bootstrapping comprising a static bootstrapping and an adaptive bootstrapping.

21 Claims, 8 Drawing Sheets

(56) References Cited

OTHER PUBLICATIONS

A. Kohrs and B. Merialdo. Improving Collaborative Filtering for New Users by Smart Object Selection. Proc. International Conference on Media Features (ICMF), 2001; 4 pages.

Y. Koren. Factor in the Neighbors: Scalable and Accurate Collaborative Filtering. ACM Transactions on Knowledge Discovery from Data 4:1, 11 pages; 2010.

Y. Koren, R. Bell and C. Volinsky. Matrix Factorization Techniques for Recommender Systems. IEEE Computer 42:8, pgs, Aug. 2009.

G. Linden, B. Smith and J. York. Amazon.com Recommendations: Item-to-item Collaborative Filtering. IEEE Internet Computing 7:1, pp. 76-80, Jan. Feb. 2003.

A. Paterek. Improving Regularized Singular Value Decomposition for Collaborative Filtering. Proc. KDD Cup and Workshop, 2007; 4 pages.

A. M. Rashid, I. Albert, D. Cosley, S. K. Lam, S. M. Mcnee, J. A. Konstan and J. Riedl. Getting to Know You: Learning New User Preferences in Recommender Systems. Proc. 7th international conference on Intelligent user interfaces (IUI), pp. 127-134, 2002.

A. M. Rashid, G. Karypis and J. Riedl. Learning Preferences of New Users in Recommender Systems: An Information Theoretic Approach. SIGKDD Explorations 10:2, pp. 90-100, 2008.

B. Sarwar, G. Karypis, J. Konstan and J. Reidl. Item-based Collaborative Filtering Recommendation Algorithms. Proc. 10th international conference on WWW, pp. 285-295, 2001.

T. Hastie, R. Tibshirani and J. H. Friedman. The Elements of Statistical Learning: Data Mining, Inference, and Prediction (2nd edition). Springer Verlag, 2009; 764 pages.

* cited by examiner

Questions

Tell us your opinion on these movies...

Lord of the Rings. The Return of the King Extended Edition (2003)
○ Like
○ Don't Like
● Don't have an opinion

Finding Nemo (Fullscreen) (2003)
○ Like
○ Don't Like
● Don't have an opinion

Something the Lord Made (2004)
○ Like
○ Don't Like
● Don't have an opinion

The Godfather (1972)
○ Like
○ Don't Like
● Don't have an opinion

BOOTSTRAPPING RECOMMENDER SYSTEM AND METHOD

FIELD OF THE DISCLOSURE

The present disclosure relates to bootstrapping a recommender system that makes item recommendations, and more particularly to a bootstrapping apparatus and method identifying questions for use in interviewing a user, e.g., a new user to the recommender system, to obtain user information for use in predicting item ratings for the user, the predicted item ratings for use in identifying item recommendations for the user.

BACKGROUND

Modern consumers are inundated with choices. Electronic retailers and content providers offer huge selections of products, with unprecedented opportunities to meet a variety of special needs and tastes. Matching consumers with the most appropriate products is not trivial, yet is a key to enhancing user satisfaction and loyalty.

Recommender systems analyze patterns of user interest in items or products to provide personalized recommendations of items that will suit a user's taste. One particular challenge that recommender systems face is handling new users; i.e., the "user cold start problem." The quality of recommendations strongly depends on the amount of data gathered from the user, making it difficult to generate reasonable recommendations to users new to the system. Yet, new users are crucial for the recommendation environment, and providing them with a good experience is essential to growing the user base of the system. Pleasing these new users is all the more challenging, as they often judge the system's value based on their first few experiences. This is particularly true for systems based on explicit user feedback, where users are required to actively provide ratings to the system in order to get useful suggestions.

SUMMARY

The present disclosure seeks to address failings in the art and to provide a bootstrapping apparatus and system.

Profiling of new users, including determining a user's item preferences, can be achieved through a bootstrapping process, which includes an interview, which elicits users to provide their opinions on certain items or categories. In accordance with one or more embodiments, the interview adapts based on responses provided by a user, or users, making best use of users' time by dynamically modifying the questions to improve the evolving profile.

In accordance with embodiments of the present application, the bootstrapping makes use of a ratings prediction module, which uses a cost function as guidance, to identify items to be used during an interview in which a user is asked to provide feedback, e.g., ratings information, for the items. In accordance with one or more such embodiments, static bootstrapping predetermines the items to be used during a user interview. In accordance with one or more embodiments, adaptive bootstrapping generates one or more decision trees used to adapt the interview in accordance with the feedback provided by the user during the interview.

In accordance with one or more embodiments, a method comprises identifying, by at least one computing device, a set of interview items for an interview in which a user is requested to provide feedback, the identifying a set of interview items comprising, for each interview item identified, determining, for each candidate item of a plurality of candidate items, a cost associated with including the candidate item in the set of interview items; identifying the interview item using the cost associated with each of the candidate items of the plurality, the cost associated with the identified interview item being less than the cost associated with unselected candidate items of the plurality of candidate items, and removing the identified interview item from the plurality of candidate items. The at least one computing device presenting at least one of the interview items to a user and requesting feedback from the user about the item in at least one page of an interview user interface; receiving the requested feedback from the user in response; and identifying one or more items as recommendations using the feedback received from the user during the interview.

A system in accordance with one or more embodiments comprises at least one processor and memory, the memory storing instructions that when executed by the at least one processor cause the at least one processor to identify a set of interview items for an interview in which a user is requested to provide feedback, identifying a set of interview items comprising, for each interview item identified, determining, for each candidate item of a plurality of candidate items, a cost associated with including the candidate item in the set of interview items; identifying the interview item using the cost associated with each of the candidate items of the plurality, the cost associated with the identified interview item being less than the cost associated with unselected candidate items of the plurality of candidate items, and removing the identified interview item from the plurality of candidate items. In accordance with the system, the memory stores instructions that when executed cause the at least one processor to present at least one of the interview items to a user and request feedback from the user about the item in at least one page of an interview user interface; receive the requested feedback from the user in response; and identify one or more items as recommendations using the feedback received from the user during the interview.

In accordance with one or more embodiments, a computer readable storage media is provided for tangibly storing thereon computer readable instructions that when executed, cause at least one processor to identify a set of interview items for an interview in which a user is requested to provide feedback, identifying a set of interview items comprising, for each interview item identified, determining, for each candidate item of a plurality of candidate items, a cost associated with including the candidate item in the set of interview items; identifying the interview item using the cost associated with each of the candidate items of the plurality, the cost associated with the identified interview item being less than the cost associated with unselected candidate items of the plurality of candidate items, and removing the identified interview item from the plurality of candidate items. The instructions, when executed, cause the processor to present at least one of the interview items to a user and request feedback from the user about the item in at least one page of an interview user interface; receive the requested feedback from the user in response; and identify one or more items as recommendations using the feedback received from the user during the interview.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer readable medium.

DRAWINGS

The above-mentioned features and objects of the present disclosure will become more apparent with reference to the following description taken in conjunction with the accompanying drawings wherein like reference numerals denote like elements and in which:

FIG. 1 provides a block diagram showing components used in accordance with one or more embodiments of the present disclosure.

FIG. 2 provides an example of a portion of a decision tree in accordance with one or more embodiments of the present disclosure.

FIG. 3, which comprises FIGS. 3A-3C, provides an example of a GenerateDecisionTree process flow in accordance with one or more embodiments of the present disclosure.

FIG. 4 provides an example of an interview screen that includes interview items from multiple decision trees.

DETAILED DESCRIPTION

Figure 1:
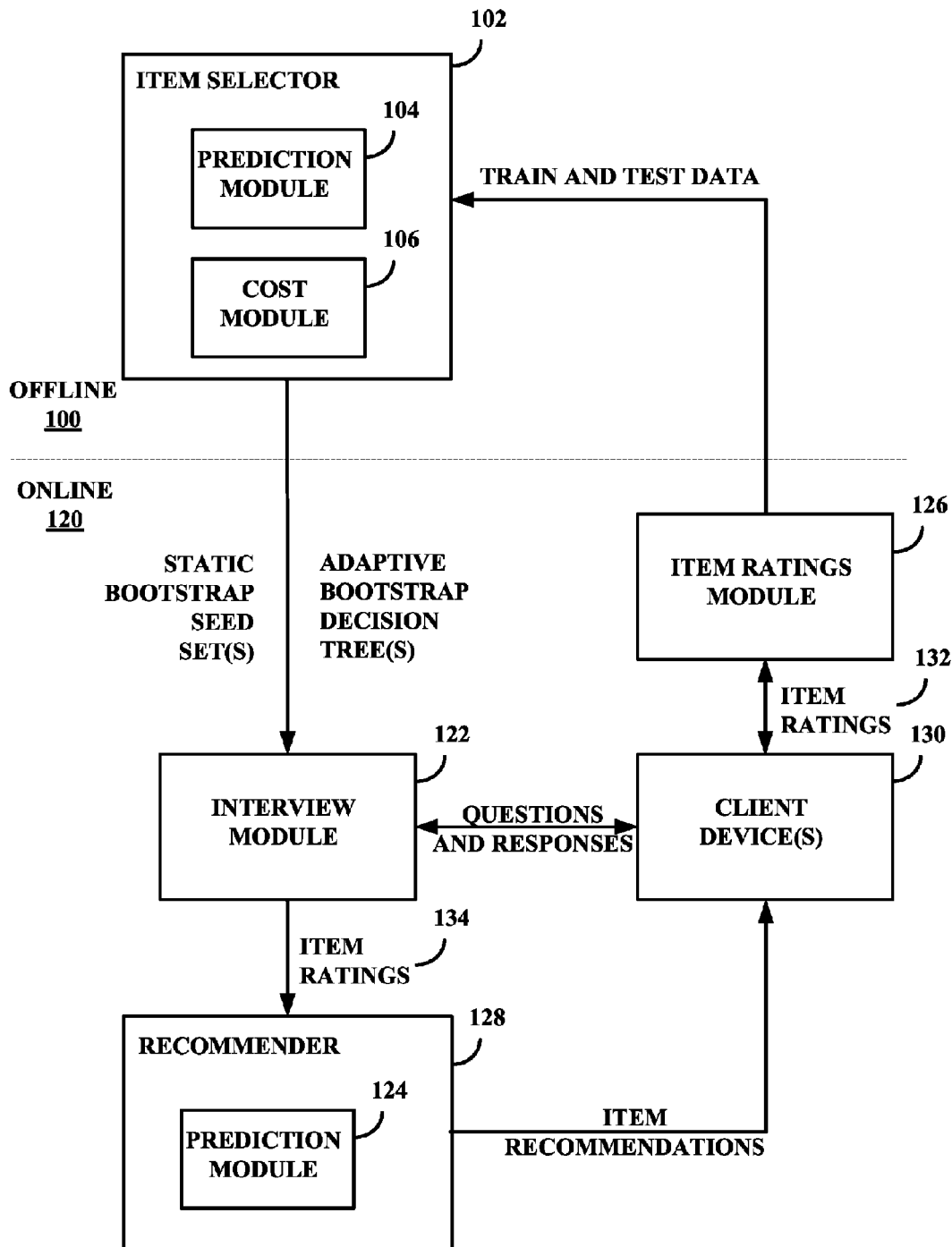

Certain embodiments of the present disclosure will now be discussed with reference to the aforementioned figures, wherein like reference numerals refer to like components.

In general, the present disclosure includes a system, method and architecture of bootstrapping a recommender system. The recommender system can be any component or system that provides item recommendations, for example. By way of some non-limiting examples, the recommender system can provide users with recommendations for such items as, without limitation, movies, music, books, multimedia, television shows, plays, news, images, products, services, etc. for sale, rent, viewing, etc. In accordance with one or more embodiments, a bootstrapping component coupled to the recommender system identifies a plurality of items to be used in an interview process to obtain user feedback, the feedback being used to identify a set of item recommendations to provide to a user of the recommender system. While the bootstrapping component can be particularly useful for a new user, the bootstrapping can be used in connection with any user.

One or more such embodiments of the present disclosure identify the one or more items used in the interview in accordance with a cost function. Embodiments of the present disclosure identify item(s) such that when training a prediction algorithm on the selected item(s), the prediction error on non-selected items is minimized. An error measure can be determined from a difference between an item rating prediction(s) and known or actual user item rating(s). A function used to measure the error is referred to herein as a cost function. By way of one non-limiting example, the cost function can be a Root Mean Square Error (RMSE) function, such as the following:

$$\sqrt{\Sigma_{(u,i)\in T}(r_{ui}-\hat{r}_{ui})^2/|T|},$$  Eq. 1 where u is a user in a user set $U=\{1, \ldots, m\}$ of m users; i is an item in item set $I=\{1, \ldots, n\}$ of n items; $r_{ui}$ is a known rating in a training set, R, of ratings and/or a testing set, T, of ratings. In Eq. 1 above, $\hat{r}_{ui}$ denotes a predicted rating of item i by user u generated by a prediction function. A known or predicted item rating can comprise a ratings, or preference, value and a (u,i) pair identifying the user and the item. By way of one non-limiting example, a rating/preference of user u for item i can be a value in a range of values, from 1 to 5, where a higher value indicates a stronger preference. In accordance with one or more embodiments, a training data set R is used to identify candidate items for inclusion in a static bootstrapping seed set or an adaptive bootstrapping decision tree; and a cost is determined using the training data set R and a test data set T. In accordance with one or more embodiments, the cost associated with an item is a function of how knowledge of that item's actual rating influences the predicted rating of other items; the cost is associated with predicting a whole item set. In accordance with one or more embodiments, a cost associated with an item depends on a state at the time that the cost is measured. By way of one non-limiting example, the cost of a movie in any node of a decision tree generated in accordance with one or more embodiments of the present disclosure is based on, and can differ based on, the previous nodes from the root that led to the node. In accordance with one or more embodiments, a determination whether or not to select a candidate item for a static bootstrapping seed set or an adaptive bootstrapping decision tree is based on a cost identified using the cost function, such as RMSE shown in Eq. 1 above. In accordance with one or more such embodiments, a greedy algorithm that makes a locally, e.g., at a given node, optimal decision in selecting an item for a static bootstrapping seed set or an adaptive bootstrapping decision tree.

From the user's perspective, an interview comprises a series of questions, each of which identifies an item and provides the user with an ability to "rate" the item, e.g., using selectable options, such as and without limitation "like," "hate," or "unknown" options. It should be apparent that ratings feedback can be solicited from the user using any of a number of different selection options, and that the "like," "hate" and "unknown" options are non-limiting examples.

In accordance with one or more embodiments, in static bootstrapping, a seed set is used to generate an interview, in which the items in the seed set are presented to a user and the user is asked to provide ratings feedback. In accordance with one or more embodiments, in adaptive bootstrapping, one or more decision trees are used to adapt the interview, e.g., the items presented to the user during the interview, based on the feedback provided by the user during the interview.

FIG. 1 provides a block diagram showing components used in accordance with one or more embodiments of the present disclosure. In accordance with one or more embodiments, item selector 102 operates offline 100 to identify items for a static bootstrapping seed set and/or an adaptive bootstrapping decision tree. In the example shown in FIG. 1, item selector 102 includes a prediction module 104, and a cost module 106 that implements a cost function. It should be apparent, however, that prediction module 104 and/or cost module 106 can be separate from item selector 102. Prediction module 104 predicts a rating for each of one or more candidate items, and cost module 106 implements a cost function used to determine cost. In accordance with one or more embodiments, in a case of static bootstrapping, prediction module 104 can be configured to use a factorized item-item prediction model, which predicts a rating for an item based on known ratings for one or more other items identified as having some similarity to the item. In accordance with one or more embodiments, in a case of adaptive bootstrapping, prediction module 104 can predict a user rating based on the ratings of users associated with a node of the decision tree. In accordance with one or more embodiments, the cost module 106 uses a cost function such as an RMSE defined in accordance with Eq. 1. It should be apparent that another cost function can be used, such as and without limitation a mean absolute error (MAE) function.

In accordance with one or more embodiments, the predicted rating values and the actual rating values can be input to the cost module 106 that implements a cost function to obtain the cost output. As discussed in connection with one or more embodiments, item selector 102 selects one or more items for a static bootstrapping seed set, and/or one items associated with nodes of an adaptive bootstrapping decision tree, that minimize cost, e.g., minimize an error between the predicted ratings and the actual ratings.

In accordance with one or more embodiments, the training data set and the test data set are maintained by an item ratings module 126, which interfaces online with one or more client devices 130 in an online environment 120. By way of some non-limiting examples, item ratings module 126 can provide a client device 130 with one or more web pages for display in a browser at the client device; a web page being used to display known item ratings 132, such as item ratings stored, e.g., in a data store (not shown), and/or new or updated item ratings received from client device 130. The item ratings maintained by item ratings module 126 include data that can be used as the training and test data by item selector 102. A user can use client device 130 to view and update existing item ratings and/or to indicate a new item rating.

Client device 130 can further be used to display an interview via a user interface provided by interview module 122 in the online environment 120. The interview can comprise one or more web pages, for example. In accordance with one or more embodiments, one or more items are presented during the interview, and the user is prompted to provide a rating for each item displayed during the interview. By way of one non-limiting example, the user can be prompted to select from a set of options, such as and without limitation "like," "hate," and "unknown" options.

The interview process can be for a new user, e.g., a user for which there is no ratings profile or information, or an existing user that has a ratings profile. The interview can be initiated in response to a request by the user for recommendations and/or in response to a request by recommender 128, for example.

Interview module 122 can use a static bootstrap seed set or an adaptive bootstrap decision tree, or trees, to identify the items to include in the interview. In a case of an adaptive bootstrap, interview module selects an initial item, or items in the case that multiple decision trees are used, for the interview, and selects subsequent items based on the user's response received from client device 130. Interview module 122 ratings information for one or more items are input to a prediction module 124. In the example shown in FIG. 1, prediction module 124 is part of recommender module or system 128. It should be apparent that prediction module 124 could be separate from recommender 128. In accordance with one or more embodiments, prediction modules 104 and 124 can be the same module, and/or use the same prediction function.

In accordance with one or more embodiments, in a case of static bootstrapping, item ratings 134 comprise ratings of seed set items provided by a user during an interview. In accordance with one or more embodiments, in a case of adaptive bootstrapping, item ratings comprise ratings information that is based on known item ratings of users associated with one or more decision tree nodes visited or traversed during the interview.

Adaptive Bootstrapping

In accordance with one or more embodiments, one or more decision trees are used to identify the items/questions that are posed to the user in an adaptive bootstrapping interview. In general, each node of the decision tree has an associated item, which can be presented to the user to prompt the user to provide a response, e.g., ratings feedback, and two or more edges, each of which connects the node to another node, e.g., a parent or child node. Each edge corresponds to one of the possible interview response options/selections by the user. During an adaptive bootstrapping interview, one or more decision trees can be traversed. Each decision tree is traversed starting at the root of the tree to a next node travelling along a labeled edge of the decision tree corresponding to the user's ratings feedback. Each node reached or visited by the traversal corresponds to an item for which the user is asked to provide ratings feedback. When the interview terminates, the user is provided with a set of item recommendations modeled by at least one node of a decision tree, e.g., the final node of the path, which may be a leaf node of a decision tree in a case that the interview is completed by the user or an internal node in a case that the user terminates the interview before it is completed. In a case that multiple decision trees are used, a node from each decision tree can be used to identify item recommendations.

Decision Tree

In accordance with at least one embodiment, the decision tree is ternary, such that each node has three edges. It should be apparent that other configurations are possible, such as and without limitation, a decision tree with nodes having fewer or greater number of edges. Each node of the tree corresponds to user sets. For each non-leaf node a single splitting item is selected to further partition the node's user population. Based on the user's response at an internal tree node, the user's interview proceeds to one of the three subtrees, according to the user's response, e.g., the user's evaluation of the item. By way of one non-limiting example, the user's response, or evaluation, is either "like," "dislike," or "unknown."

Figure 2:
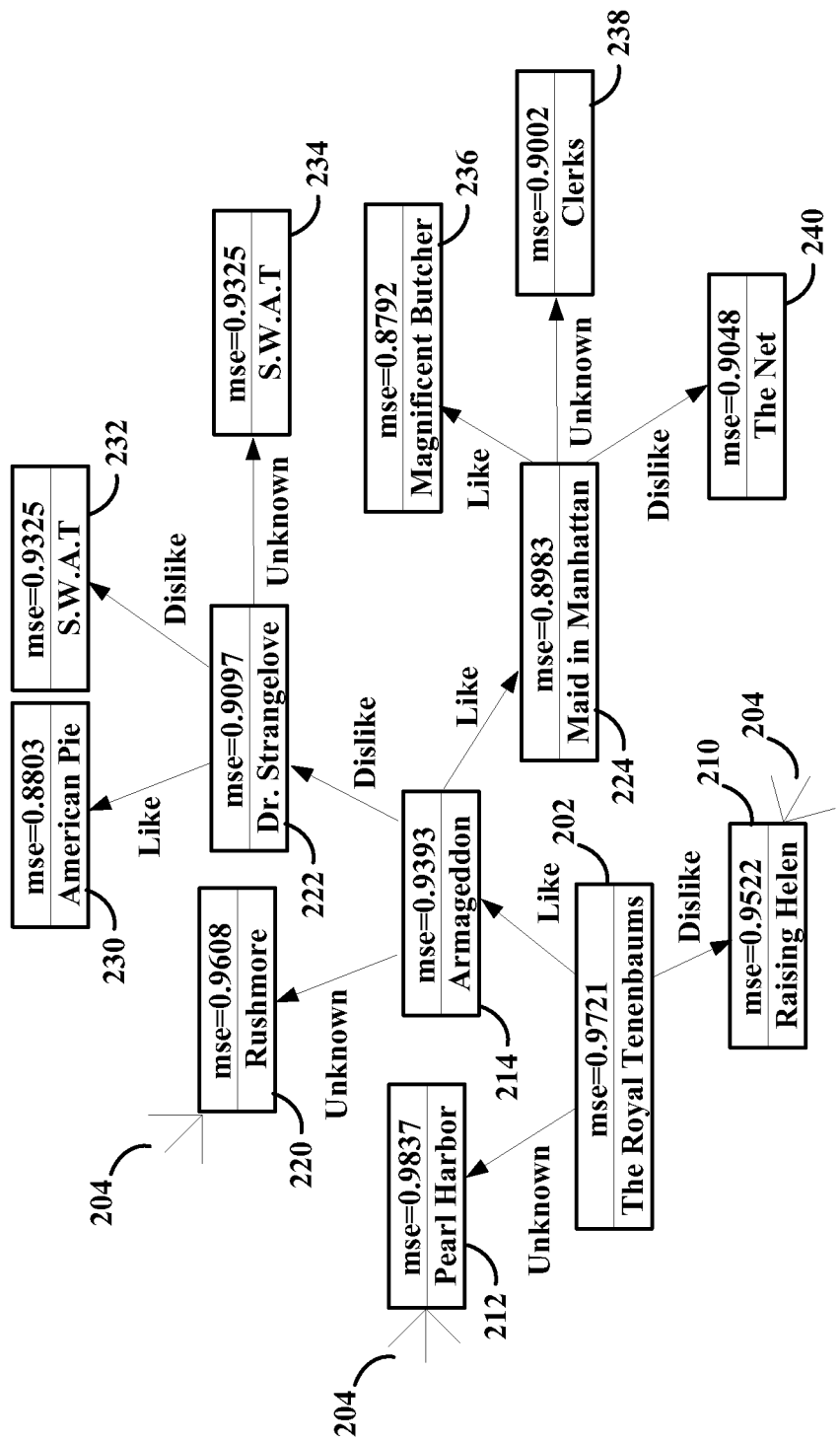

FIG. 2 provides an example of a portion of a decision tree in accordance with one or more embodiments of the present disclosure. The decision tree 200 shown in the example is a ternary tree, which has three edges each corresponding to a possible answer by the user. Each node represents a question involving an item that can be posed to the user as part of an interview. In the example, in accordance with root node 202 of the decision tree 200, the interview begins by asking the user to provide feedback for the movie "The Royal Tenenbaums," e.g., the feedback in the example is "Like," "Dislike," or "Unknown." Each of the feedback options correspond to an edge of the decision tree 200. If the user responds indicating a "Like," the edge labeled "Like" is traversed to node 214 of decision tree 200, and the interview progresses by asking the user to provide feedback with respect to the movie "Armageddon." Each of the nodes 210, 212, 214 can be reached from the root node 202. Nodes 220, 222 and 224 can be reached from node 214, nodes 230, 232 and 234 can be reached from node 222; and nodes 236, 238 and 240 can be reached from node 224. For the sake of simplicity of the example, the paths 204 from nodes 210 and 212 are shown without nodes at the base of the path. Additionally and for the sake of simplicity, the first three levels of the decision tree 200 are shown. The decision tree 200 can have deeper layers, or levels, however. A number of layers or levels for the decision tree can be based on a decision to terminate tree generation. Termination of decision tree generation is discussed in more detail below.

The decision tree has an associated cost function value, e.g., an RMSE value. In accordance with one or more embodiments, an RMSE value represents a measure of a squared error, or squared loss, e.g., determined by prediction module 104. The error reported on a tree node relates to predicting a whole dataset.

A decision tree is created and optimized by analyzing known item preferences identified based on a training data set used to generate the decision tree. The training data set comprises a plurality of items and user ratings for the plurality of items. By way of some non-limiting example, the ratings can be expressed using a numerical range of values, or a number of stars as a star rating, which can be mapped to a preference space. By way of one non-limiting example, in the case that a five star rating system is mapped to a ternary preference space, four and five star ratings for an item, e.g., a movie, might be mapped to a "like" preference space, one, two and three star ratings, might be mapped to a "hate" preference space, and unrated items might be mapped to an "unknown" preference space. Determination of a cutoff between the "like" and "hate" indicators can be based on a rating average determined from a training data set rating average. By way of one non-limiting example, in a case that the training data set rating average is 3.6, ratings that fall below the average, i.e., one, two and three stars, are mapped to the "hate" preference space and the star ratings that are above the average, i.e., 4 and 5, are mapped to the "like" preference space.

Each node of a decision tree, whether internal or a leaf, represents a group of users. By way of a non-limiting illustration, in the case of a ternary decision tree, such as that shown in FIG. 2, for example and without limitation, given a tree node t, e.g., node 202 in FIG. 2, and an item i, associated with the node, e.g., the movie "The Royal Tenenbaums," also referred to herein as a "splitting item," three subtrees are defined, one subtree represents the portion of users that "like" the movie, another subtree represents the portion of users that "hate" the movie, and the third subtree represents the users for whom a preference is "unknown." The decision tree's root, e.g., node 202 of FIG. 2, represents the user population as a whole. The node 214 connected to the "like" edge from the root node 202 represents the users that are associated with the root node, e.g., the population of users, that have indicated that they "like" the movie "The Royal Tenenbaums," e, the node 210 connected to the "dislike" edge from the root node 202 represents the users from the population of users that "hate" "The Royal Tenenbaums," and the node 212 connected to the "unknown" edge from the root node 202 represents the remaining users from the user population, e.g., the users that neither "like" nor "hate" "The Royal Tenenbaums." By way of a further non-limiting example, the users associated with the node at the root of the "like" subtree off of node t, e.g., traversing the "Like" edge, node 214 is at the root of the "subtree" off of node 202, are those users in the training data set that "like" the splitting item, e.g., "The Royal Tenenbaums," identified for node t, the users associated with the node at the root of the "hate" subtree off of node t are those users that "hate" the node t's splitting item, and the remaining users associated with node t users are the users associated with the "unknown" subtree root node.

Recommendation—Adaptive Bootstrapping

In accordance with one or more embodiments, since each node represents a group of users, each node of the tree can be used to predict the interview user's rating of an item i based on the ratings for the item i provided by the users associated with the node, e.g., the item ratings by the associated users can be averaged to determine a mean rating of the item i. The mean rating can be used as a prediction, e.g., an $\hat{r}_{u,i}$, of the interview user's rating of item i. The mean rating can be used together with an actual rating identified in the test data set to determine the measured error associated with the node, e.g., using RMSE and Eq. 1.

In accordance with one or more embodiments, the rating predicted at node t for item i can be denoted as $\hat{r}_t(i)$. As is discussed below, $\hat{r}_t(i)$, can be determined to be an average of ratings values given for i by the user population associated with node t. In accordance with one or more embodiments, a user that traverses a decision tree to node t, e.g., by following a path from the root node to node t, is given a set of recommendations from a set of recommendations associated with node t. By way of one non-limiting example, the user receives as recommendations a number of the top ranked items associated with node t. By way of a further non-limiting example, each node of the tree can store a full vector of predicted items, or information identifying the items, or a subset of the full vector, e.g., a number of the top-ranked recommended items. In accordance with one or more embodiments, item rankings can be based on item ratings by users associated with node t.

A node may represent a small population, or smaller population relative to other nodes of the decision tree. Such a node might be found at a deeper layer of the tree. The small population associated with the node might result in less accurate estimations, which statistically overfit its limited training observations. One approach to address this is to prune the tree and remove one or more nodes having an associated small population, e.g., in a post-processing phase after generating the decision tree. However, within a single tree node, one item might be supported with a substantial rating population, thereby providing a reliable estimation, while another item might be covered by a small population. Pruning a node as a whole might not be appropriate in such a case, e.g., where items have non-uniform rating patterns.

In accordance with one or more embodiments, a hierarchical smoothing can be used to avoid outfitting. At the root node, q, of a decision tree, a predicted ratings value, $\hat{r}^q(i)$, for item i is determined to be the average ratings values given by the user population, which can be expressed as $\hat{r}^q(i)$=sum$(q)_i/n(q)_i$, where sum$(q)_i$ is the sum of the ratings values and n$(q)_i$ is the number of ratings values. For each non-root node t, a predicted ratings value, $\hat{r}^t(i)$, for item i can be determined using the following:

$$\hat{r}^t(i) = \frac{\text{sum}(t)_i + \lambda_i \hat{r}^p(i)}{n(t)_i + \lambda_i} \quad \text{Eq. 2}$$

where sum$(t)_i$ is the sum of the ratings values for item i and node t, and n$(t)_i$ is the number of ratings values, $\hat{r}^p(i)$ is the predicted ratings value for the parent node, p, and item, i, such that for each non-root tree node t, the predicted value for item i is shrunk towards the value computed at its parent p. A shrinkage constant $\lambda_1$, which might have an empirical value such as 200, indicates a pull towards the more robust value computed at the parent (which may have been shrunk towards its own parent, unless it is the root node q). As node t has more users rating i, e.g., a larger n$(t)_i$, it can make predictions of i with less dependence on its parent value.

Once a user traversing the tree terminates the interview at node t, a plausible recommendation policy would be to recommend to the user the items rated highest by the users associated with node t. However, such a strategy could yield conservative recommendations, as RMSE-based predictors tend to stay near robust averages and typically "play it safe" with generally liked items. This can be manifested by the hierarchical smoothing, which is important to RMSE minimization and risk control, by ensuring that big deviations from common values require adequate evidence.

In accordance with one or more embodiments, conservative ranking can be modified in a way that injects more serendipity or discovery. To achieve this, items that users belonging to the current tree node rate significantly higher than the general population are identified. The rating value of item i attained at the root, q, can be denoted as $\mu_i \stackrel{\text{def}}{=} \hat{r}^q(i)$. For users at tree node t, a differential rating value can be defined for item i as:

$$\hat{d}^t(i) = \hat{r}^t(i) - b\mu_i \qquad \text{Eq. 3}$$

By way of one non-limiting example, b can be a constant with a value of 0, which results in a standard ranking; setting the constant b=1 yields ranks items in accordance their gap from the overall agreeable mean, so the system suggests those items most unique to the user. Empirical analysis indicates that higher b values, as the value of b approaches 1, bring better experience. In such a case, a default setting can be b=0.8, for example and without limitation.

Multiple Decision Trees

In accordance with one or more embodiments, multiple decision trees can be used in an interview. Use of multiple decision trees maximizes the possibility that the user will know the root item for at least one tree. Empirical analysis indicates that in a case that the user has an opinion on the item associated with the root node, error is lower than in the case that the user does not know the item at the root of the decision tree, e.g., the RMSE is lower in a case that the user is able to provide a rating for the root node's item. In accordance with one or more embodiments, the user traverses the multiple trees simultaneously, and for each of the tree layers, the user is presented with several items, e.g., an item at a current layer from each of the multiple trees. In addition to increasing the possibility that the user will know at least one of the decision tree's root items, there is also an increased possibility that the user will be familiar with one of the items displayed at another layer of one or more of the decision trees.

Another benefit of using multiple trees is that one interview page, or screen, of a user interface can include several items, and users typically prefer to rate several items together on the same page. Additionally, multiple decision trees can boost prediction accuracy. By way of one non-limiting example, assume that there are K different decision trees, each of the K different decision trees can be used to predict $r_{ui}$. Each of the K trees can provide a different prediction, or estimate, of $r_{ui}$. In such a case, a mean of the predicted values of $r_{ui}$ can be determined and used as the predicted value. As yet another non-limiting example, one or more blending techniques can be used, e.g., by solving a regression problem (e.g., using the test set as a target) to assign a weight to each tree, and combine the predicted values together according to their weights. Another non-limiting example that can be used with one or more embodiments of the present disclosure, takes into account that tree branches may not be equal with respect to their contribution, e.g., "like" feedback is typically more useful that an "unknown" response. Rather than weighting a single tree as a whole, leaves of the trees can be differentiated based on each one's usefulness. For each of the K trees, the leaf in which user u falls, which is the leaf used in predicting $r_{ui}$, is identified. Thus, instead of having K trees predicting $r_{ui}$, there are K leaves predicting $r_{ui}$: $t_1, \ldots, t_K$.

The following provides an example of an expression used to take a combined prediction as a weighted combination, where more predictive leaves receive a higher weight:

$$\hat{r}_{ui} = \frac{\sum_{k=1}^{K} w_{t_k} \hat{r}^{t_k}(i)}{\sum_{k=1}^{K} w_{t_k}}, \qquad \text{Eq. 4}$$

where $w_{t_k}$ denotes the weight of leaf $t_k$, and $\hat{r}^{t_k}(i)$ denotes the prediction for item i at leaf $t_k$. Each leaf node corresponds to a unique path starting at the root. The predictions at a node may tend to be more accurate where there are more "like" edges on the path and less "unknown" edges. Also, nodes at deeper layers (corresponding to longer paths) provide a more refined user profiling, and produce more accurate predictions. Such assumptions can be used to quantify the weight, $w_t$, of node t for a given item i as follows:

$$w_t = (\#L(t) * w_L + \#H(t) * w_H + \#U(t) * w_U)^c, \qquad \text{Eq. 5}$$

where $\#L(t)$ denotes the number of "like" votes in the path leading to t, $\#H(t)$ denotes the number of "dislike" ("hate") votes in the path, and $\#U(t)$ represents the number of "unknown" votes. Parameters $w_L$, $w_H$ and $w_U$ measure a weight of each kind of vote, and c is an exponent of the total sum. In accordance with one or more embodiments, values of the three parameters and the exponent can be optimized, via empirical testing, to minimize a blending error. By way of some non-limiting examples, the values can be set as follows: $w_L = 5$, $w_H = 1$, $w_U = 0.02$ and c=2. Such values reflect findings indicating that an unknown vote is relatively insignificant, and that a "like" vote is considerably more useful than a "dislike."

By way of one non-limiting example, K can be a value ranging from 1 to 5 decision trees, which results in having K questions simultaneously presented in a single screen or page of an interview user interface. As discussed above, the K trees can be selected randomly. Alternatively, K trees can be selected based on one or more considerations. By way of one non-limiting example, selection can be based on identified accuracy of each decision tree at prediction. By way of another non-limiting example, decision trees can be selected that complement each other, such as and without limitation, decision trees that present different questions at their root nodes to maximize the chance that the user will be familiar with at least one of the presented items.

These considerations and others can be resolved by posing the problem as a task to best predict the full test set, which uniformly represents all known users, e.g., identifying a subset of K trees, blending of which in accordance with Eq. 4 minimizes the error identified via the test set. By way of one non-limiting example, a tree with a lowest RMSE can be selected, and each tree added thereafter is one that lowers RMSE by the greatest amount. In a case of one sample dataset, empirical analysis indicates that with five trees, RMSE is decreased to an acceptable level, e.g., RMSE is decreased from 0.9725 to 0.9656, and that a greater value of K may be impractical for a user-friendly bootstrapping process. As K approaches 30, an RMSE of 0.9622, which stabilizes and converges around 0.9617 with K greater than 30. Of course, these values are relative to this one sample dataset, and can be entirely different on other datasets. By way of one non-limiting example, the selection can be randomized, such that the initial tree is randomly selected, which allows for different sets of trees to be selected, so that repeated users get a different experience each time they use the system. As an alternative to randomly selecting the initial tree, a measured randomness can be added throughout the process of selecting the K trees.

FIG. 4 provides an example of an interview screen that includes interview items from multiple decision trees. The sample screen shown in FIG. 4 includes questions from four trees used in parallel, which results in presenting four questions simultaneously to the user. In accordance with one or more embodiments, a default can be set, e.g., "Don't have an opinion." If a default is used, the user has the ability to change the default by clicking on another of the options. The user has the ability to select one of the options for each of the movies shown in the interview page 400. Even if the default is not shown on the interview page, if the user does not enter a response, a default can be assumed, for example.

Decision Tree Generation

In accordance with at least one embodiment, a top-down approach is used to generate a decision tree. In accordance with one or more embodiments, the splitting item that is selected for a node is the item that partitions the users associated with the node into three sets such that an error, e.g., squared error or squared loss determined using a cost function such as RMSE, is minimized. By way of a non-limiting example, for each internal node, a splitting item, is chosen for the node.

In accordance with one or more embodiments, the top-down approach builds the decision tree by recursively calling a GenerateDecisionTree(t) function. Each call to the function identifies an item, or splitting item, for a node t of the decision tree. In accordance with one or more such embodiments, a splitting item associated with a node is selected by looping over all of the candidate items to identify the squared error associated with each candidate item, and the candidate item that minimizes the squared error for the training ratings of users associated with the node is selected. In a case that RMSE is used as the squared error metric, a candidate item is selected that minimizes the RMSE for a given node, so as to minimize the RMSE for the decision tree as a whole.

Figure 3A:
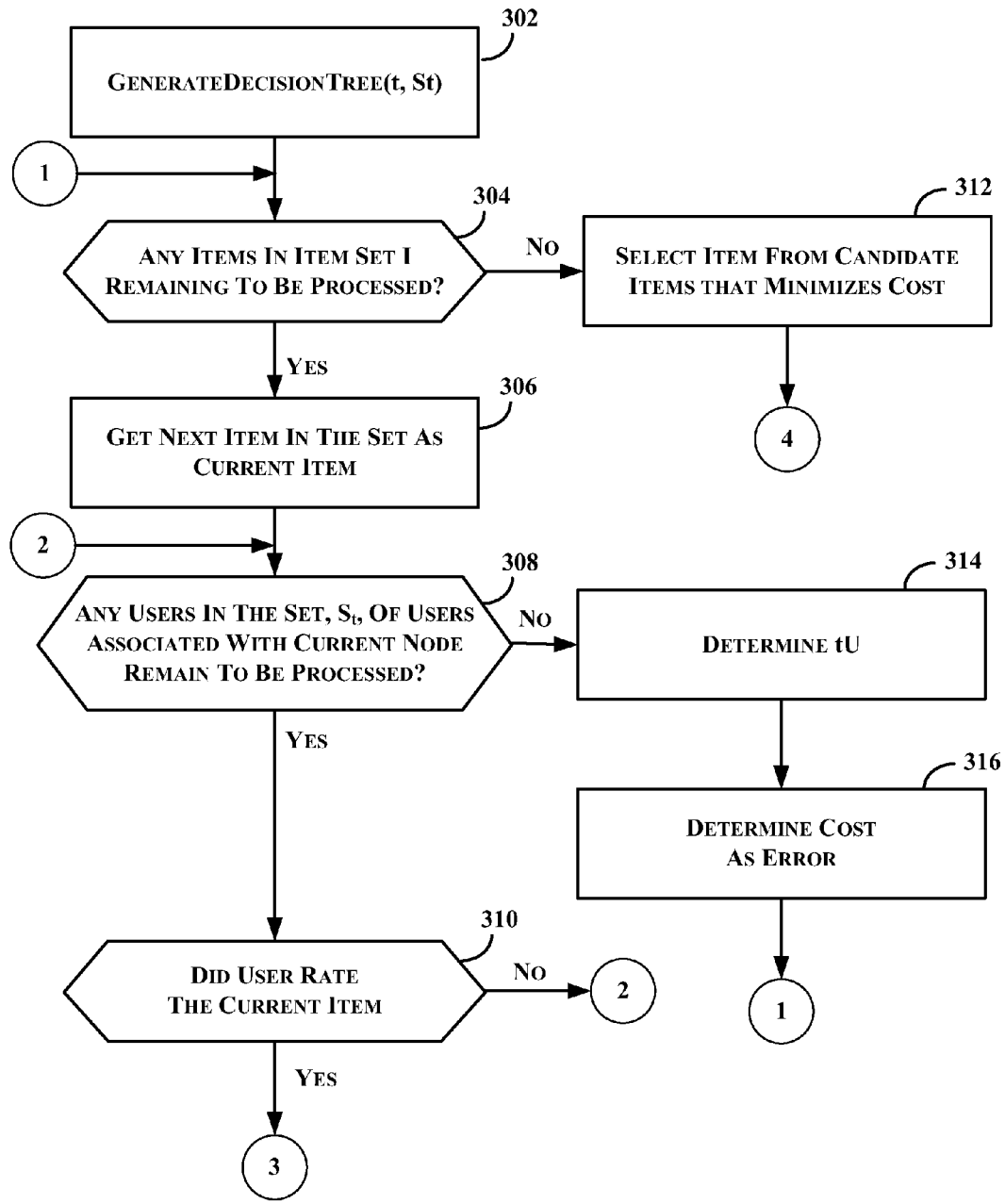
Figure 3B:
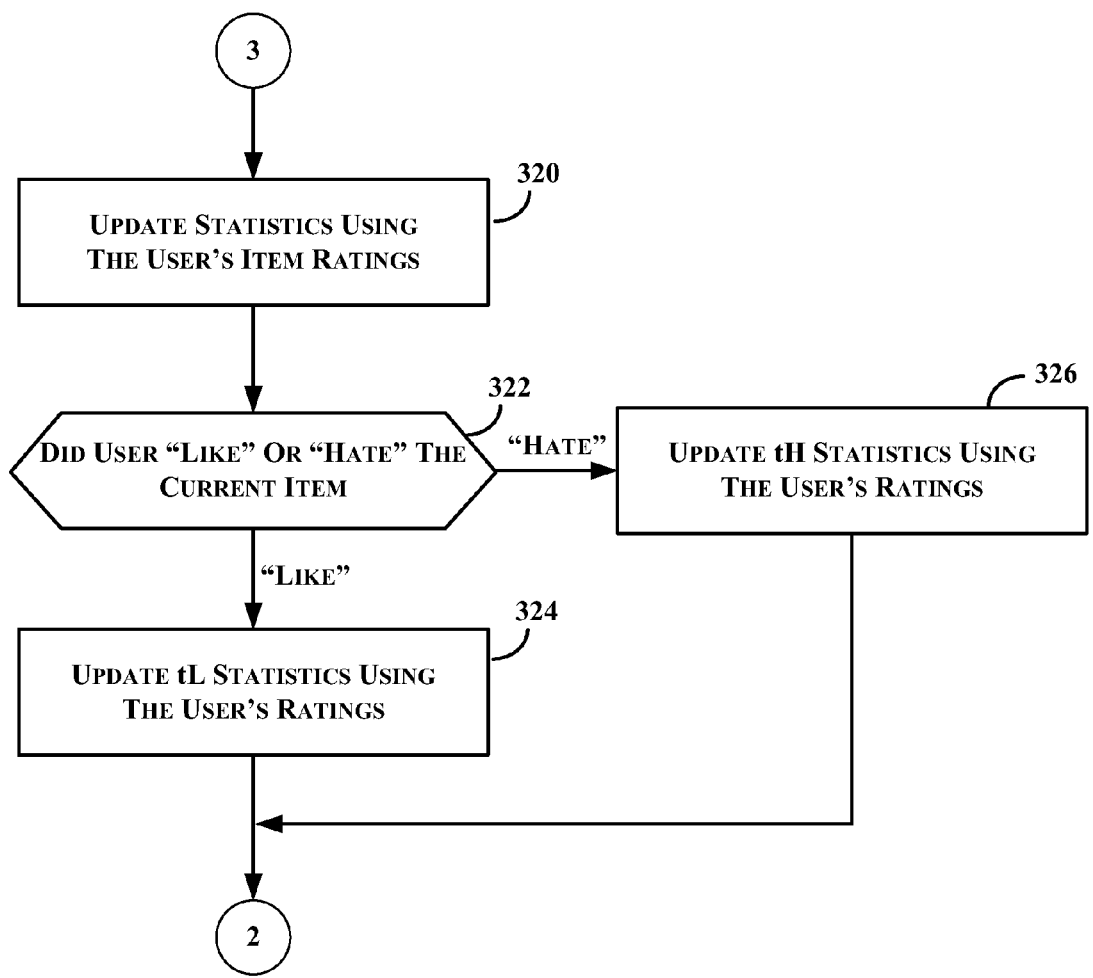
Figure 3C:
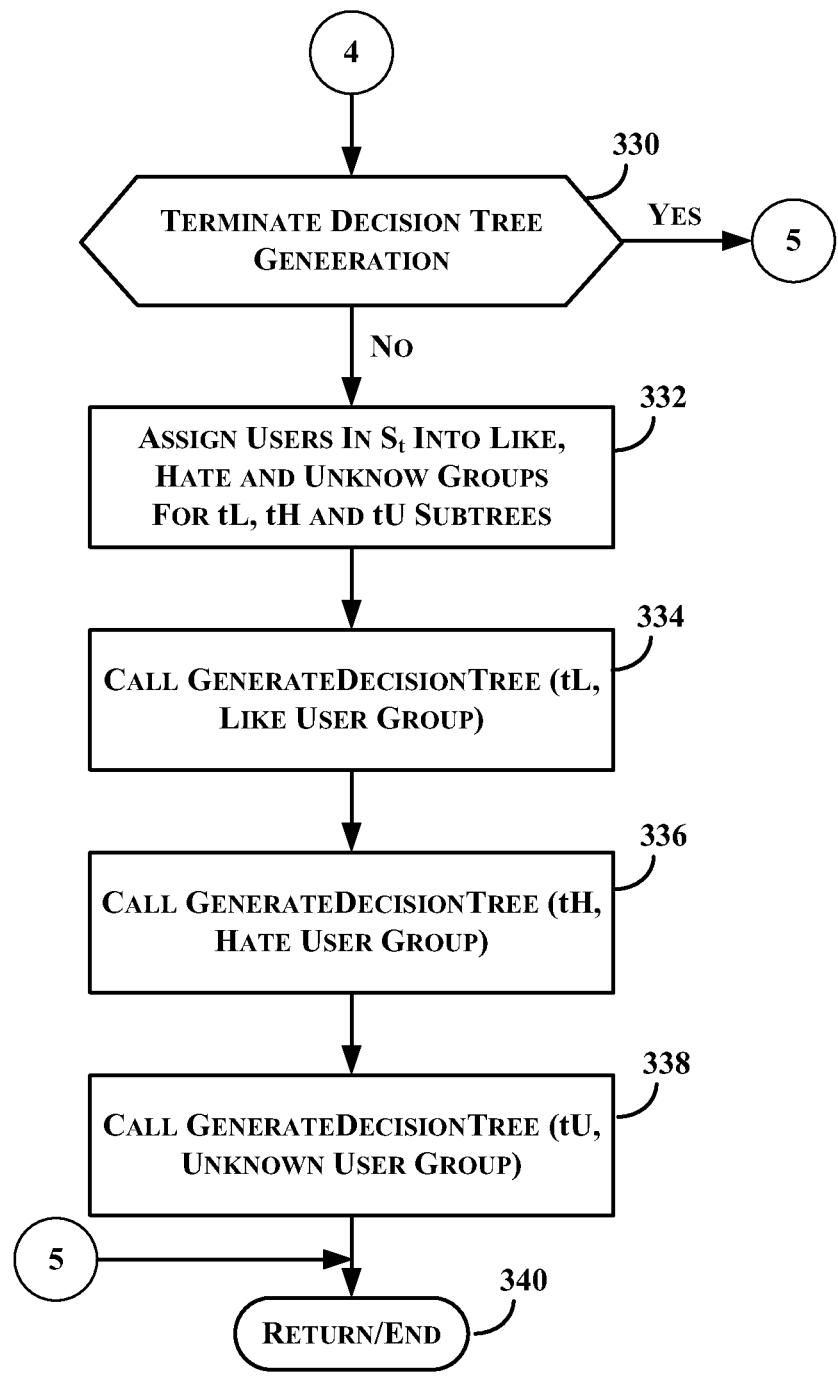

FIG. 3, which comprises FIGS. 3A-3C, provides an example of a GenerateDecisionTree process flow for use in accordance with one or more embodiments of the present disclosure. In accordance with one or more embodiments, the GenerateDecisionTree identifies a splitting item for a node t using a set $S_t$ of users associated with node t. The splitting item identified for node t minimizes the cost determined using an error measure or metric such as RMSE.

At step 304, a determination is made whether or not there are any items in the set of items, I, remaining to be processed. If not, the splitting item is selected from the one or more candidate items, and processing continues at step 330, of FIG. 3C, to determine whether or not to add additional nodes to the decision tree. Criteria that might be used to determine whether to add additional nodes or to terminate decision tree generation are discussed below.

If it is determined at step 304, of FIG. 3A, that there are items in the set of items, I, remaining to be processed, processing continues at step 306 to get the next item from I. At step 308, a determination is made whether or not any users in the set $S_t$ of users associated with node t remain to be processed. If so processing continues at step 310 to determine whether or not the a next user rated the current item. If not, processing continues at step 308 to process any remaining users. If so, processing continues at step 320, of FIG. 3B, to update statistics using the user's ratings of items. For items j rated by the user, the user's rating of items j, $r_{uj}$, are added to a sum, sum$(t)_j$, of ratings of items j by the users that rated the current item i, e.g., see Eq. 10 below, the user's ratings of items j, $r_{uj}$ are added to a squared sum, sum$^2(t)_j$, of the ratings of items j by the users that rated the current item i, e.g., see Eq. 11 below, and a count, n(t), of the number of users in set $S_t$ and have rated items j is incremented, e.g., see Eq. 12 below.

At step 322, of FIG. 3B, a determination is made whether or not the user falls in the "Like" of "Hate" category for the current item.

If the user falls in the "Like" category for the current item, processing continues at step 324 to add, for items j rated by the user, the user's rating of items j, $r_{uj}$, to a sum, sum$(t)_j$, of ratings of items j by the users that "Like" the current item i, e.g., see Eq. 10 below, add the user's ratings of items j, $r_{uj}$ to a squared sum, sum$^2(t)_j$, of the ratings of items j by the users that "Like" the current item i, e.g., see Eq. 11 below, and increment a count, n(t), of the number of users in set $S_t$ that "Like" the current item and have rated items j, e.g., see Eq. 12 below.

If the user "Hates" the current item, processing continues at step 326 to add, for items j rated by the user, the user's rating of items j, $r_{uj}$, to a sum, sum$(t)_j$, of ratings of items j by the users that "Hate" the current item i, e.g., see Eq. 10 below, add the user's ratings of items j, $r_{uj}$ to a squared sum, sum$^2(t)_j$, of the ratings of items j by the users that "Hate" the current item i, e.g., see Eq. 11 below, and increment a count, n(t), of the number of users in set $S_t$ that "Hate" the current item and have rated items j, e.g., see Eq. 12 below.

Processing continues at step 308 of FIG. 3A to process any remaining users in $S_t$. If it is determined, at step 308, that all of the user in set $S_t$ have been processed, processing continues at step 314 to determine the "Unknown" statistics: a sum, sum$(tU)_j$, of ratings of items j by users that neither "Like" nor "Hate" the current item i, e.g., see Eq. 13 below, a squared sum, sum$^2(tU)_j$, of the ratings of the items j by users that neither "Like" nor "Hate" the current item i, e.g., see Eq. 14 below, and a count, n$(tU)_j$, of the number of users in set St that neither "Like" nor "Hate" the current item and have rated items j, e.g., see Eq. 15 below.

At step 316, a cost for the current item i is determined, e.g., a squared error, Err$_t$(i), associated with splitting by item i at node t using Eq. 6 discussed below. Processing continues at step 304 to process any remaining items in item set I. If all of the items in item set I have been processed, processing continues at step 312 to select a splitting item from the candidate items processing by GenerateDecisionTree using Eq. 7, for example.

Processing continues, at step 330 of FIG. 3C, to determine whether or not to add additional levels to the decision tree. By way of one non-limiting example, a determination can be made in accordance with criteria and/or considerations discussed below.

If it is determined not to add another level to the decision tree, e.g., not to add children nodes to the current node t, processing of the current node ends at step 340. If it is determined to add another layer to the decision tree, e.g., to add children nodes to the current node t, processing continues at step 332 to assign users in $S_t$ into subgroups associated with the three child nodes of the current node t. In the example, node t has three child nodes, each of which is the root node, tL, tH, and tU, of a subtree, corresponding, respectively, to the "like," "dislike," and "unknown" edges off of node t. The users are partitioned into the subgroups based their "like" or "hate" for the splitting item selected at step 312 of FIG. 3A for the parent node of the three child nodes.

At steps 334, 336 and 338, GenerateDecisionTree is called for each of nodes tL, tH, and tU and the respective users, to identify the splitting item for each node. Processing ends at step 340.

The squared error, Err$_t$(i), associated with splitting by item i at node t can be identified using the following:

$$Err_t(i) = e^2(tL) + e^2(tH) + e^2(tU), \qquad \text{Eq. 6}$$

In accordance with one or more embodiments, as expressed by Eq. 6, the squared error associated with splitting by item i at node t is the sum of the squared error determined for each of node t's subtrees, e.g., an aggregate of the squared errors of the descendant nodes identified in the subtrees of node t.

A squared error can be determined for each item i at node t, in accordance with Eq. 8 discussed below, and the item that has the least error associated with it is selected as the splitting item for node t. The following provides an exemplary formalized expression for selecting an item v as the splitting item for a node t to minimize the error associated with node t:

$$\text{splitter}(t) \overset{\text{def}}{=} \arg_v \min Err_t(v) \qquad \text{Eq. 7}$$

In accordance with one or more embodiments, the squared error associated with a node t and item i can be determined in accordance with the following:

$$e^2(t)_i = \Sigma_{u \in S_t \cap R(i)}(r_{ui} - \mu(t)_i)^2, \qquad \text{Eq. 8}$$

where $S_t$ is a set of users from the user population U defined in the training data set, $u \in S_t \cap R(i)$ corresponds to each user u in set $S_t$ that rated item i, which is expressed as the intersection of the set, $S_t$, of users associated with node t and the set, R(i), of users rating item i, $r_{ui}$ is a rating given by a user u to item i, and $\mu(t)_i$ is a predicted value, which can be an average of the ratings of the users associated with node t, which can be determined, for example, as follows:

$$|S_t \cap R(i)|^{-1} \Sigma_{u \in S_t \cap R(i)} r_{ui} \qquad \text{Eq. 9}$$

In accordance with one or more embodiments, $e^2(tU)$ from Eq. 6 can be inferred. Since each user typically rates a fraction of the total items, the "unknowns" user group is typically much larger, on average, than the "like" and "hate" user groups. Measurements can be computed for the "like" and "hate" groups and these measurements can be used to infer the measurements for the "unknown" group. Such an approach avoids determining the measurements for the "unknown" group, thereby avoiding expending computer processing resources to determining these measurements, and/or minimizing the time used to perform the computations.

In accordance with one or more embodiments, a plurality of statistical values can be determined as set forth below in Eqs. 10-12, for each node t and item j. One such statistical value is a sum of the ratings for j by each user u in the set $S_t$ of users associated with node t that rated j, which, e.g., can be computed using Eq. 10 below. Another statistical value represents a sum of the square of each rating of j by a user u in the set $S_t$, which, e.g., can be computed using Eq. 11 below. As yet another example of a statistical value of the plurality that can be determined is the number of users that are in set $S_t$ and have rated item j, denoted below as R(j), which, e.g., can be computed using Eq. 12 below.

$$\text{sum}(t)_j = \sum_{u \in S_t \cap R(j)} r_{uj} \qquad \text{Eq. 10}$$

$$\text{sum}^2(t)_j = \sum_{u \in S_t \cap R(j)} r_{uj}^2 \qquad \text{Eq. 11}$$

$$n(t)_j = |S_t \cap R(j)| \qquad \text{Eq. 12}$$

Equations 10-12 are used for each item j in the set of items I to determine the three values, $\text{sum}(t)_j$, $\text{sum}^2(t)_j$ and n(t), based on the ratings of users in set $S_t$ that rated item j. The equations are also used to determine, for each item j, three values, $\text{sum}(tL)_j$, $\text{sum}^2(tL)_j$ and $n(tL)_j$, for those users in set $S_t$ that belong to the "like" group and to determine, for each item j, the three values, $\text{sum}(tH)_j$, $\text{sum}^2(tH)_j$ and $n(tH)_j$, for those user in set $S_t$ that belong to the "hate" group. The statistical values for the "unknown" group can be derived for each item j as follows:

$$\text{sum}(tU)_j = \text{sum}(t)_j - \text{sum}(tL)_j - \text{sum}(tH)_j \qquad \text{Eq. 13}$$

$$\text{sum}^2(tU)_j = \text{sum}^2(t)_j - \text{sum}^2(tL)_j - \text{sum}^2(tH)_j \qquad \text{Eq. 14}$$

$$n(tU)_j = n(t)_j - n(tL)_j - n(tH)_j \qquad \text{Eq. 15}$$

A total measured error for all of the items j at node t can be expressed as:

$$e^2(t) = \sum_j \text{sum}^2(t)_j - (\text{sum}(t)_j)^2 / n(t)_j \qquad \text{Eq. 16}$$

In accordance with one or more embodiments, one or more termination criteria can be used to determine decision tree depth, e.g., when to terminate the decision tree generation. By way of one non-limiting example, the termination criteria can be a predefined tree depth, e.g., a tree depth of 6 or 7. The predefined tree depth can be determined empirically, e.g., going beyond the predefined depth is empirically determined to yields limited accuracy gain, and/or may be considered imprudent use of the user's time and effort, as it may not yield much more insight into the user's preferences and/or might cause the user to lose interest. Another non-limiting example criteria that can be used to determine the decision tree depth, or decision tree termination, is on a determination that the best splitting item identified for a node fails to provide some, or any, reduction in the squared error reduce the squared error: $\min_i Err_t(i) \geq e^2(t)$. As yet another non-limiting example, criteria for terminating decision tree generation can be based on a determination that the number of ratings at the current node drops below a predefined threshold $\alpha$. That is $\Sigma_{u \in S_t} |R(u)| < \alpha$. This criteria is based on an assumption that as the size of the population shrinks, the expected reliable refinement to be gained is diminishing. As one non-limiting example, $\alpha$ can be some value, e.g., 200,000 ratings, that is empirically determined to yield run time savings with minimal effect on accuracy. As with any value or constant used herein is by way of example and is not intended to be exhaustive and other values are possible.

In accordance with one or more embodiments, Eqs. 10 and 11 can be modified to account for bias, e.g., user bias, which may reflect systematic tendencies for some users to give higher ratings than others. Eqs. 16 and 17 show the modifications to Eqs. 10 and 11, respectively:

$$\text{sum}(t)_j = \sum_{u \in S_t \cap R(j)} r_{uj} - b_u \qquad \text{Eq. 16}$$

$$\text{sum}^2(t)_j = \sum_{u \in S_t \cap R(j)} (r_{uj} - b_u)^2, \qquad \text{Eq. 17}$$

where $b_u$ can be determined by taking the mean rating of each user, shrunk toward global mean rating $\mu$. The following provides a non-limiting example:

$$b_u = \frac{\sum_{i \in R(u)} r_{ui} + \lambda \mu}{|R(u)| + \lambda} \qquad \text{Eq. 18}$$

where $\lambda$ is a regularization constant and prevents overfitting when a user provides only a few ratings. By way of a non-limiting example, $\lambda = 7$. In accordance with one or more embodiments, biases can be used to better approximate a true squared error, while learning the training data. In accordance with one or more embodiments, biases can be used in the tree generation phase. A tree built while accounting for biases can provide an improvement over a tree built without accounting for biases.

In accordance with one or more embodiments, some randomization can be used in decision tree generation. By way of some non-limiting example, such randomization can be beneficial to yield different behavior for the bootstrapping recommender system, e.g., in a case that the user tries the interview process multiple times, and/or in a case that multiple decision trees are used in the interview process. To facilitate randomization, a node i has a probability proportional to $\max(0, e^2(t) - \text{Err}_r(i))^a$ to be selected as the splitter item. In so doing, items that more significantly reduce the squared loss have a better chance to be selected as splitters. The constant a dictates how strongly the distribution is to be concentrated at those items with the greatest reduction of the squared loss. Picking a=infinity ($\infty$) would be equivalent to a non-randomized deterministic selection rule. By way of one non-limiting example, 200 randomized trees can be generated with a setting a=10.

Static Bootstrapping

In accordance with one or more embodiments, a static bootstrapping approach uses a seed set of items for a user interview, in which the questions posed to the user are predetermined prior to the interview.

The seed set can have a number, K, items and is incrementally grown. Each item added to the seed set is determined to minimize the error relative to the other candidate items for the seed set. Embodiments of the present disclosure use a prediction model, such as and without limitation a factorized item-item model, to generate a predicted rating, and a cost function, such as and without limitation RMSE, to measure the error associated with predicting ratings and the actual ratings.

Formally, let A denote the prediction method, and fix the train set. In accordance with one or more embodiments, prediction method A makes predictions of user preferences by considering, for each individual user, the user's train ratings of the items in seed set S. The performance measure (on the train set) is denoted by a function F. In accordance with at least one embodiment, K items are selected for the seed set that minimize the error measure generated by function F. In accordance with one or more such embodiments, a K-item seed set S, which is a subset of the set of items I is generated such that:

$$S = \arg\min_{S \subset I, |S|=K} F(A(S)), \qquad \text{Eq. 19}$$

such that the item $\arg\min_{i \in I-S} F(A(S \cup \{i\}))$ is added incrementally to S.

During a user interview, items in the seed set are presented to a user and the user is asked to provide feedback in the form of a rating, such as "like," "hate" or "unknown." The answers provided by the user in the interview can be provided to prediction method A to make item rating predictions of the user. The item rating predictions can be used to generate a set of item recommendations for the user.

Figure 5:
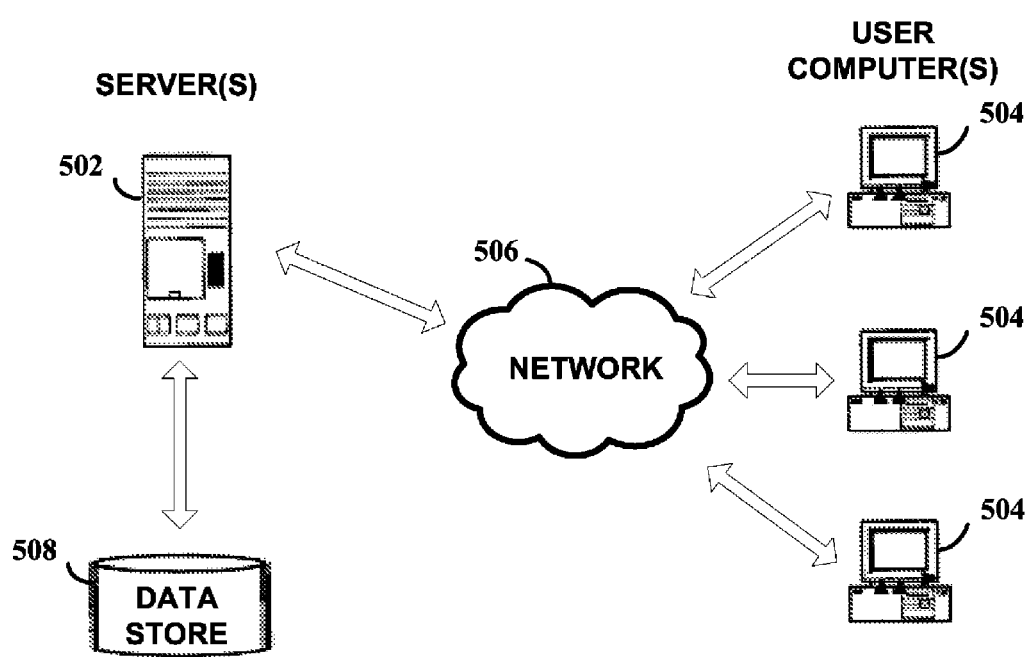
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices 502, e.g., one or more servers, client computing devices 130 or other computing device, are configured to comprise functionality described herein, e.g., functionality described in accordance with one or more of the components shown in FIG. 1.

Computing device 502 can serve content, such as and without limitation web pages, audio and/or video content, etc., to user computers 504 using a browser application, and/or other application, via a network 506. Data store 508 can be used to store data including without limitation training and/or test data sets used in either or both of static and adaptive bootstrapping, adaptive bootstrapping decision tree(s), static bootstrapping seed set(s), etc., program code to configure a server 502 to execute functionality in accordance with one or more embodiments of the present disclosure, etc.

The user computer 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computer 504 can include one or more processors, memory, a removable media reader, network interface, display and interface, and one or more input devices, e.g., keyboard, keypad, mouse, etc. and input device interface, for example. One skilled in the art will recognize that server 502 and user computer 504 may be configured in many different ways and implemented using many different combinations of hardware, software, or firmware.

In accordance with one or more embodiments, a computing device 502 can make a user interface, such as and without limitation one or more interview screens or web pages and/or one or more screens containing recommendations, available to a user computer 504 via the network 506. In accordance with one or more embodiments, computing device 502 makes a user interface available to a user computer 504 by communicating a definition of the user interface to the user computer 504 via the network 506. The user interface definition can be specified using any of a number of languages, including without limitation a markup language such as Hypertext Markup Language, scripts, applets and the like. The user interface definition can be processed by an application executing on the user computer 504, such as a browser application, to output the user interface on a display coupled, e.g., a display directly or indirectly connected, to the user computer 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 5. Alternatively, embodiments of the present disclosure can be implemented other environments, e.g., a peer-to-peer environment as one non-limiting example.

Figure 6:
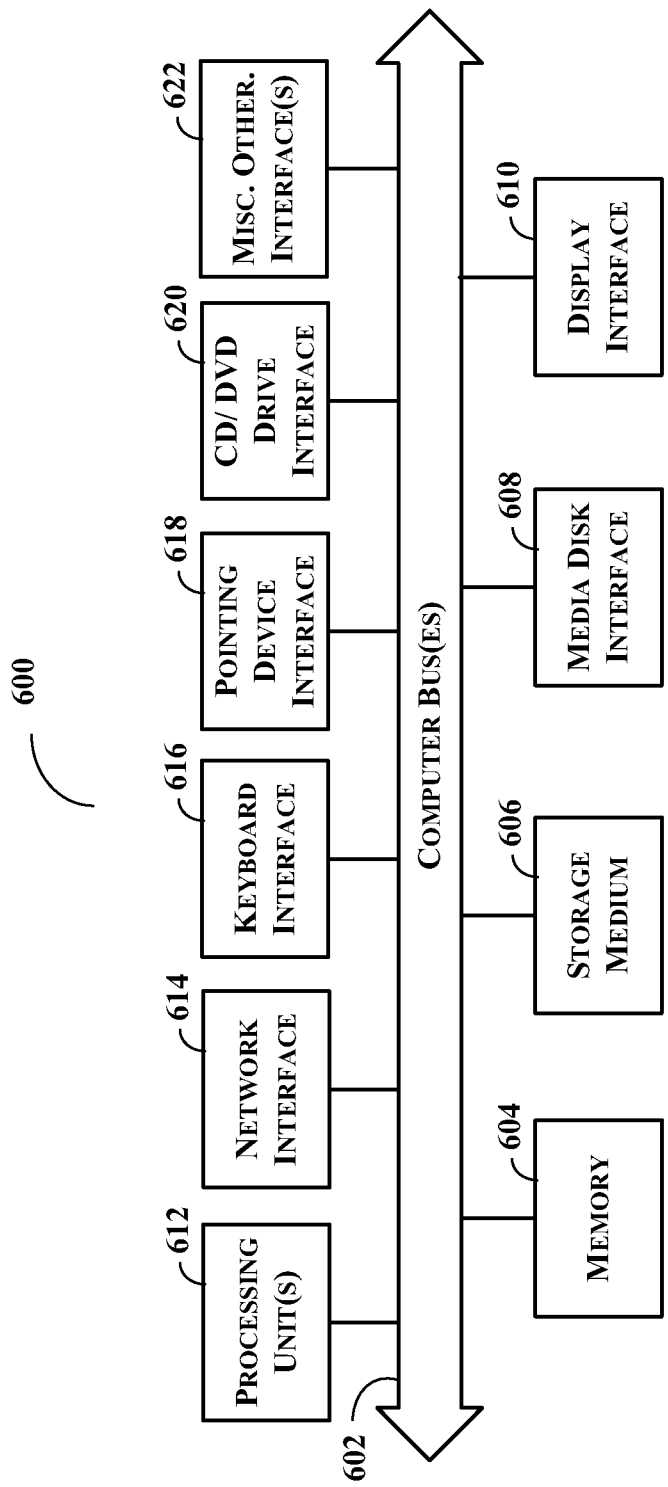
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 602 or user computer 604, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
identifying, by at least one computing device, a set of interview items for an interview in which a user is requested to provide feedback, the identifying a set of interview items comprising, for each interview item identified:
  determining, for each candidate item of a plurality of candidate items, a cost associated with including the candidate item in the set of interview items;
  identifying the interview item using the cost associated with each of the candidate items of the plurality, the cost associated with the identified interview item being less than the cost associated with unselected candidate items of the plurality of candidate items;
  removing the identified interview item from the plurality of candidate items;
presenting, by the at least one computing device, at least one of the interview items to a user and requesting feedback from the user about the item in at least one page of an interview user interface;
receiving, by the at least one computing device, the requested feedback from the user in response; and
identifying, by the at least one computing device, one or more items as recommendations using the feedback received from the user during the interview.

2. The method of claim 1, wherein the interview is adaptive, and wherein a second interview item of the set of interview items is presented in the adaptive interview subsequent to a first interview item of the set, the second interview item being presented based on the feedback received during the interview from the user.

3. The method of claim 2, wherein the user is asked to provide the feedback by selecting one of a plurality of options associated with the first interview item, wherein each interview item in the set of interview items corresponds to a node of a decision tree, the decision tree comprising a plurality of nodes, each node having a corresponding set of users and the cost associated with the corresponding interview item, and wherein the node is connected to another node via an edge representing one of the plurality of options.

4. The method of claim 3, further comprising:
in response to receiving the feedback for the first interview item, traversing the decision tree from a first node associated with the first interview item along an edge to reach a second node, the edge that is traversed corresponding to the one of the plurality of options selected by the user as the feedback for the first interview item, and the second node corresponding to the second interview item; and presenting, in the interview user interface, the second interview item corresponding to the second node reached by traversing the decision tree along the edge from the first node to the second node.

5. The method of claim 3, identifying one or more items as recommendations using the feedback from the user to the interview items presented during the interview further comprising:

identifying the one or more items as recommendations using item ratings of the users associated with at least one node of the decision tree traversed during the interview.

6. The method of claim 1, wherein the interview is static, and wherein the at least one of the interview items is presented in the static interview independent of the feedback received from the user for another interview item presented in the static interview.

7. The method of claim 6, identifying one or more items as recommendations using the feedback from the user to the at least one of the interview items presented during the interview further comprising:

identifying the one or more items as recommendations using the feedback as ratings for the at least one of the interview items presented during the interview.

8. A system comprising:

at least one processor for executing instructions that when executed by the at least one processor cause the at least one processor to:

identify a set of interview items for an interview in which a user is requested to provide feedback, identifying a set of interview items comprising, for each interview item identified:

determining, for each candidate item of a plurality of candidate items, a cost associated with including the candidate item in the set of interview items;

identifying the interview item using the cost associated with each of the candidate items of the plurality, the cost associated with the identified interview item being less than the cost associated with unselected candidate items of the plurality of candidate items;

removing the identified interview item from the plurality of candidate items;

present at least one of the interview items to a user and request feedback from the user about the item in at least one page of an interview user interface;

receive the requested feedback from the user in response; and identify one or more items as recommendations using the feedback received from the user during the interview.

9. The system of claim 8, wherein the interview is adaptive, and wherein a second interview item of the set of interview items is presented in the adaptive interview subsequent to a first interview item of the set, the second interview item being presented based on the feedback received during the interview from the user.

10. The system of claim 9, wherein the user is asked to provide the feedback by selecting one of a plurality of options associated with the first interview item, wherein each interview item in the set of interview items corresponds to a node of a decision tree, the decision tree comprising a plurality of nodes, each node having a corresponding set of users and the cost associated with the corresponding interview item, and wherein the node is connected to another node via an edge representing one of the plurality of options.

11. The system of claim 10, further comprising instructions that when executed by the at least one processor cause the at least one processor to:

in response to receiving the feedback for the first interview item, traverse the decision tree from a first node associated with the first interview item along an edge to reach a second node, the edge that is traversed corresponding to the one of the plurality of options selected by the user as the feedback for the first interview item, and the second node corresponding to the second interview item; and present, in the interview user interface, the second interview item corresponding to the second node reached by traversing the decision tree along the edge from the first node to the second node.

12. The system of claim 10, the instructions to identify one or more items as recommendations using the feedback from the user to the at least one of the items presented during the interview further comprising instructions that when executed by the at least one processor cause the at least one processor to:

identify the one or more items as recommendations using item ratings of the users associated with at least one node of the decision tree traversed during the interview.

13. The system of claim 8, wherein the interview is static, and wherein the at least one of the interview items is presented in the static interview independent of the feedback received from the user for another interview item presented in the static interview.

14. The system of claim 13, the instructions to identify one or more items as recommendations using the feedback from the user to the items presented during the interview further comprising instructions that when executed by the at least one processor cause the at least one processor to:

identify the one or more items as recommendations using the feedback as ratings for the at least one of the interview items presented during the interview.

15. A non-transitory computer readable storage media for tangibly storing thereon computer readable instructions that when executed, cause at least one processor to:

identify a set of interview items for an interview in which a user is requested to provide feedback, identifying a set of interview items comprising, for each interview item identified:

determining, for each candidate item of a plurality of candidate items, a cost associated with including the candidate item in the set of interview items;

identifying the interview item using the cost associated with each of the candidate items of the plurality, the cost associated with the identified interview item being less than the cost associated with unselected candidate items of the plurality of candidate items;

removing the identified interview item from the plurality of candidate items;

present at least one of the interview items to a user and request feedback from the user about the item in at least one page of an interview user interface;

receive the requested feedback from the user in response; and identify one or more items as recommendations using the feedback received from the user during the interview.

16. The media of claim 15, wherein the interview is adaptive, and wherein a second interview item of the set of interview items is presented in the adaptive interview subsequent to a first interview item of the set, the second interview item being presented based on the feedback received during the interview from the user.

17. The media of claim 16, wherein the user is asked to provide the feedback by selecting one of a plurality of options associated with the first interview item, wherein each interview item in the set of interview items corresponds to a node of a decision tree, the decision tree comprising a plurality of nodes, each node having a corresponding set of users and the cost associated with the corresponding interview item, and wherein the node is connected to another node via an edge representing one of the plurality of options.

18. The media of claim 15, further comprising instructions that when executed, cause at least one processor to:
  in response to receiving the feedback for the first interview item, traverse the decision tree from a first node associated with the first interview item along an edge to reach a second node, the edge that is traversed corresponding to the one of the plurality of options selected by the user as the feedback for the first interview item, and the second node corresponding to the second interview item; and
  present, in the interview user interface, the second interview item corresponding to the second node reached by traversing the decision tree along the edge from the first node to the second node.

19. The media of claim 17, the instructions that when executed, cause at least one processor to identify one or more items as recommendations using the feedback from the user to the at least one of the items presented during the interview further comprising instructions that when executed, cause at least one processor to:
  identify the one or more items as recommendations using item ratings of the users associated with at least one node of the decision tree traversed during the interview.

20. The media of claim 15, wherein the interview is static, and wherein the at least one of the interview items is presented in the static interview independent of the feedback received from the user for another interview item presented in the static interview.

21. The media of claim 20, instructions that when executed, cause at least one processor to identify one or more items as recommendations using the feedback from the user to the items presented during the interview further comprising instructions that when executed, cause at least one processor to:
  identify the one or more items as recommendations using the feedback as ratings for the at least one of the interview items presented during the interview.

* * * * *